(12) United States Patent
Harned et al.

(10) Patent No.: US 7,224,469 B2
(45) Date of Patent: May 29, 2007

(54) OPTICAL SYSTEM ALIGNMENT SYSTEM AND METHOD WITH HIGH ACCURACY AND SIMPLE OPERATION

(75) Inventors: Robert D. Harned, Redding, CT (US); Nora-Jean Harned, Redding, CT (US)

(73) Assignee: ASML Holding N.V., Veldhoven (NL)

( * ) Notice: Subject to any disclaimer, the term of this patent is extended or adjusted under 35 U.S.C. 154(b) by 312 days.

(21) Appl. No.: 10/938,954

(22) Filed: Sep. 13, 2004

(65) Prior Publication Data

US 2005/0206908 A1    Sep. 22, 2005

Related U.S. Application Data

(60) Provisional application No. 60/554,420, filed on Mar. 19, 2004.

(51) Int. Cl.
*G01B 9/02* (2006.01)

(52) U.S. Cl. .................................... 356/508; 356/521

(58) Field of Classification Search ................ 356/508, 356/521, 519, 399, 400
See application file for complete search history.

(56) References Cited

U.S. PATENT DOCUMENTS

| | | | |
|---|---|---|---|
| 5,638,169 A | | 6/1997 | Hollmann et al. |
| 6,930,783 B2 * | | 8/2005 | Kim .......................... 356/508 |

OTHER PUBLICATIONS

"Alignment CGHs", Diffraction International Ltd., 1997-2003, retrieved from the Internet on Feb. 15, 2005 : <URL:http://www.diffraction.com/HA50.html>, pp. 1-3 and pp. 1.

Sixt, P., "Phase Masks and Grey-Tone Masks", Litomask by CSEM, retrieved from the Internet on Feb. 15, 2005 :<URL:http://www.semiconductorfabtech.com/features/lithography/articles/2.209.shtml> pp. 1-11.

Kumler, J. et al. "Alignment Technique for Optical Assemblies", Coastal Optical Systems, Inc., pp. 1-10.

"Laser Alignment and Assembly Station: Model LAS-001 User Manual P/N 900100", Opto-Alignment Technology, Rochester, NY, Rev. B., Mar. 1998.

Chapman et al., "Alignment of a ring-field EUV projection optics system visible-light interferometry", Lawrence Livermore National Laboratory, Livermore, CA, 2000.

"T.I.R. Gages—Air Bearing Spin: Table Ultra-Precision T.I.R. Measurements", IBTech, Inc., http://www.abtechmfg.com/tir.html, 2003, last viewed Dec. 12, 2006.

Search Report, dated Oct. 18, 2006, for International Application No. PCT/US05/09258, 9 pages.

* cited by examiner

*Primary Examiner*—Hwa (Andrew) Lee
(74) *Attorney, Agent, or Firm*—Sterne, Kessler, Goldstein & Fox P.L.L.C.

(57) ABSTRACT

A system for aligning of optical components includes an interferometer and a first diffractive alignment element. A housing is used for positioning a first optical element being aligned. A detector is used for detecting fringes produced by reflections off surfaces of the first optical element. A grating pattern on the first diffractive alignment element is designed to produce a retro-reflected wavefront or a wavefront transmitted or reflected in a predetermined direction when the first optical element is in alignment. The first diffractive alignment element includes a first region for alignment of the interferometer, a second region for alignment of one surface of the first optical element, and a third region for alignment of another surface of the first optical element. The first, second and third regions can be of any shape such as circular, rectangular, triangular, or the like.

15 Claims, 4 Drawing Sheets

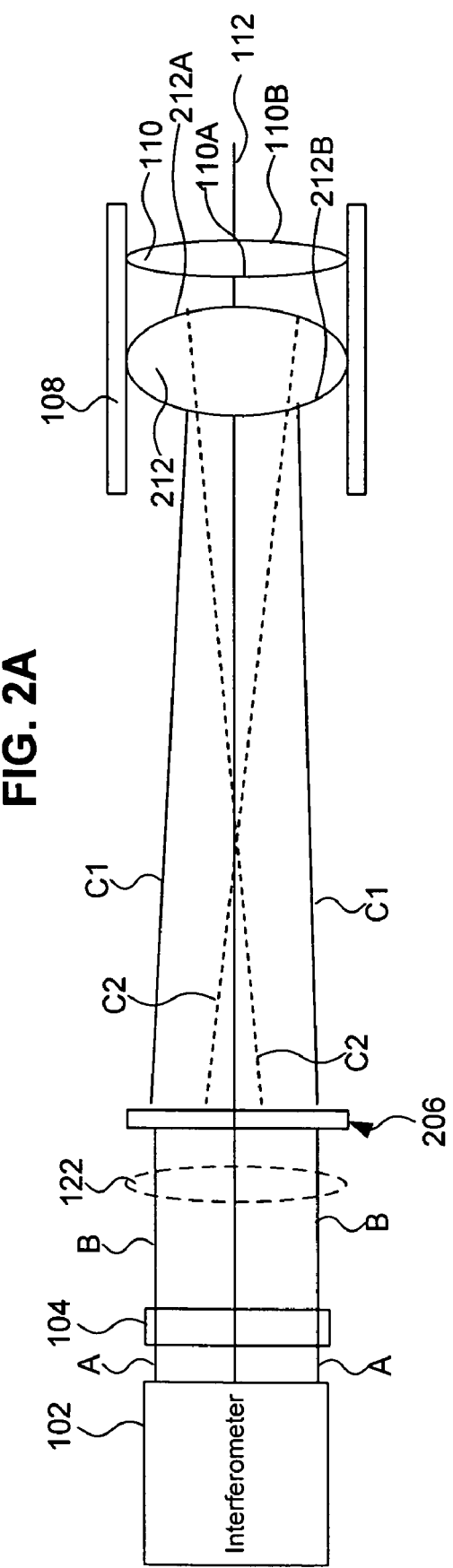
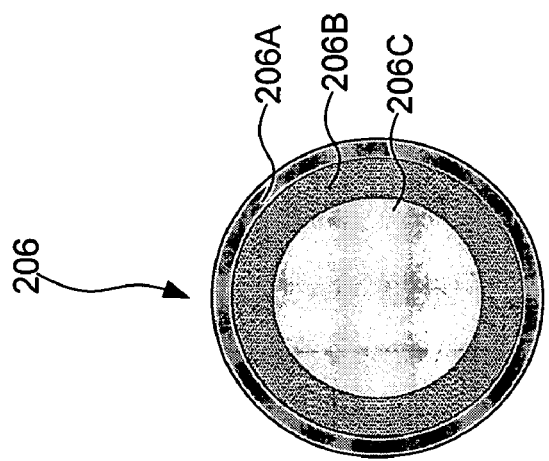
FIG. 2A
FIG. 2B

OPTICAL SYSTEM ALIGNMENT SYSTEM AND METHOD WITH HIGH ACCURACY AND SIMPLE OPERATION

CROSS-REFERENCE TO RELATED APPLICATIONS

This application claims priority to U.S. Provisional Application No. 60/554,420, filed Mar. 19, 2004, titled "OPTICAL SYSTEM ALIGNMENT SYSTEM AND METHOD WITH HIGH ACCURACY AND SIMPLE OPERATION," which is incorporated herein by reference in its entirety.

BACKGROUND OF THE INVENTION

1. Field of the Invention

The present invention relates to alignment of optical components, and more particularly, to alignment of reflective and refractive optical components in high precision optical systems.

2. Related Art

Most multiple lens assemblies are currently aligned using one (or more) of the following methods:

(a) Mechanical indicators are used for either (or both) centering the outside diameter and minimizing the apparent wedge between lens surfaces relative to the lens cell;

(b) Alignment telescopes can be used for aligning centers of curvatures of the lens elements to a common optical axis;

(c) Fabricating the lens elements and the lens cell to very tight optical and mechanical tolerances, so that a "slip fit" of the elements in the cell results in an aligned system; and (d) Coarsely assembling the lens, measuring the lens' wavefront and distortion across its field of view, and calculating the adjustments required to each lens element to minimize the wavefront error and distortion.

For optical systems requiring diffraction-limited performance (as needed for lithography optics), the first three of these techniques do not have the necessary alignment accuracy. To even get close to diffraction-limited performance, state-of-the-art mechanical and optical measuring systems are required. Optimizing the alignment using measured wavefront and distortion data requires either of the first two alignment methods to be performed as a starting point. The alignment process that uses the measured wavefront and distortion data is an iterative process. Because of cross-coupling of errors in the optical system, several measurements and alignment adjustments are required to successfully align a system. The exact number of iterations required to align a system depends on the designed quality.

Aligning an optical system using mechanical indicators does not account for homogeneity errors that can have the same effect as a mechanical wedge. Mechanical indicators and their related tooling (air bearing rotary tables, etc.) do not have the required accurately to align high quality optical systems, such as lithography optical systems. Because a mechanical probe or an air gauge must either be in contact, or be in very close proximity, to the lens element being aligned, there are frequently mechanical interferences with the lens cell structure. The probe is actually measuring an extremely small region on the lens surface. This region may not accurately represent the full optical surface.

An alignment telescope's sensitivity is limited by the angular resolution of its optical system, the distance between the lens being aligned and the alignment telescope, and how well the alignment telescope optics are aligned. Commercially available alignment telescopes do not have the required accuracy. A custom-designed and fabricated alignment telescope has a limited range over which it can be used, because it works only for a limited range of lens radii of curvatures. This results in the need to build at least several alignment telescopes (or additional optical elements and mechanical components to an existing alignment telescope), each of which has to be aligned to tolerances close to what is required for a lithography lens. Alignment telescopes are difficult to use on short radii of curvature lens surfaces, due to the small amount of light captured by the alignment telescope aperture. Alignment telescopes are also not usable with lenses and mirrors that have aspheric surfaces. The asphericity causes the image reflected off the surface being aligned to be badly aberrated, making it impossible to achieve fine alignment tolerances.

Measuring an optical systems wavefront and distortion, and then back-calculating the alignment errors, is very time consuming and difficult, unless one starts with the optical system being relatively close to the optimum alignment condition. Multiple alignment iterations are required because of the cross coupling of the alignment aberrations between all the surfaces.

Accordingly, there is a need in the art for a fast and simple method of aligning optical surfaces.

SUMMARY OF THE INVENTION

The present invention relates to an optical system alignment system and method with high accuracy and simple operation that substantially obviates one or more of the disadvantages of the related art.

More particularly, in an exemplary embodiment of the present invention, a system for aligning of optical components includes an interferometer and a first diffractive alignment element. A housing is used for positioning a first optical element being aligned. A detector, normally part of the interferometer system, is used for detecting fringes produced by reflections off surfaces of the first optical element. A grating pattern on the first diffractive alignment element is designed so if the element it is designed to align is in fact perfectly aligned then a "null" (or predetermined) interference pattern will be visible in the interferometer. A null (or predetermined) interference pattern indicates there is no optical path difference between the position of the optic being aligned and its ideal location in the X, Y, Z, azimuth, elevation and rotation axes. The first diffractive alignment element includes a first region for alignment of the interferometer, a second region for alignment of one surface of the first optical element, and a third region for alignment of another surface of the first optical element. The first, second and third regions can be any shape, such as circular, rectangular or some arbitrary shape. The grating pattern is designed to diffract rays so that they strike the surface being aligned at normal incidence, or at an angle that results the rays being transmitted or reflected in a particular direction. The first diffractive alignment element can be replaced by a second diffractive optical alignment for alignment of a second optical component. The first diffractive alignment element can include a plurality of regions, each region used for alignment of a different surface of a plurality of optical components being aligned within the housing. At least one of the regions is used for alignment of an aspheric surface. The plurality of regions correspond to a plurality of surfaces of a multi-element lens being aligned. The first optical element can be a reflective element or a refractive element.

The first optical element can be an off-axis optical element. A second diffractive alignment optical element can produce interference fringes in the interferometer using a reflection off an off-axis optical element. The second diffractive alignment optical element can be a transmissive grating or a reflective grating. The first optical component can have a spherical surface or an aspheric surface. A transmission flat, a transmission sphere, or a lens can be between the interferometer and the first diffractive alignment element.

During the alignment process the fringe pattern is evaluated either visually or with an interferogram reduction program to assess the status of the alignment process. The element being aligned is adjusted until residual aberration level in the interference pattern is at an acceptable level.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings:

FIGS. 2A and 2B illustrate an alignment system according to the present invention that may be used to align a multi-element lens.

DETAILED DESCRIPTION OF THE INVENTION

Reference will now be made in detail to the preferred embodiments of the present invention, examples of which are illustrated in the accompanying drawings.

The proposed lens alignment technique uses an interferometer and diffractive optics, with specially designed alignment zones, to align optical systems containing lenses, mirrors and diffractive optics to sub-arc-second angular and sub-micron displacement tolerances. A diffractive alignment element is written preferably using lithographic technologies on a substrate. The grating pattern that is required is easily designed using commercially available optical design programs. The actual alignment process and data analysis is the same as used when testing spherical, aspherical optics using diffractive optics.

Figure 1C:
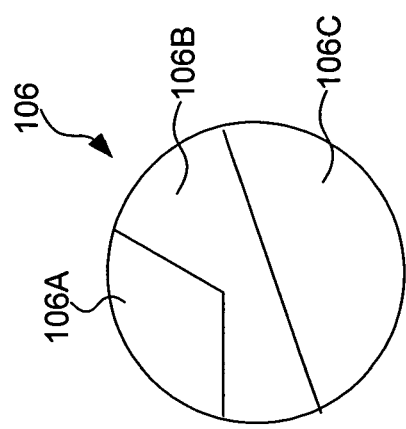
FIGS. 1A, 1B and 1C show an alignment system according to the present invention for use in lens alignment.
Figure 1A:
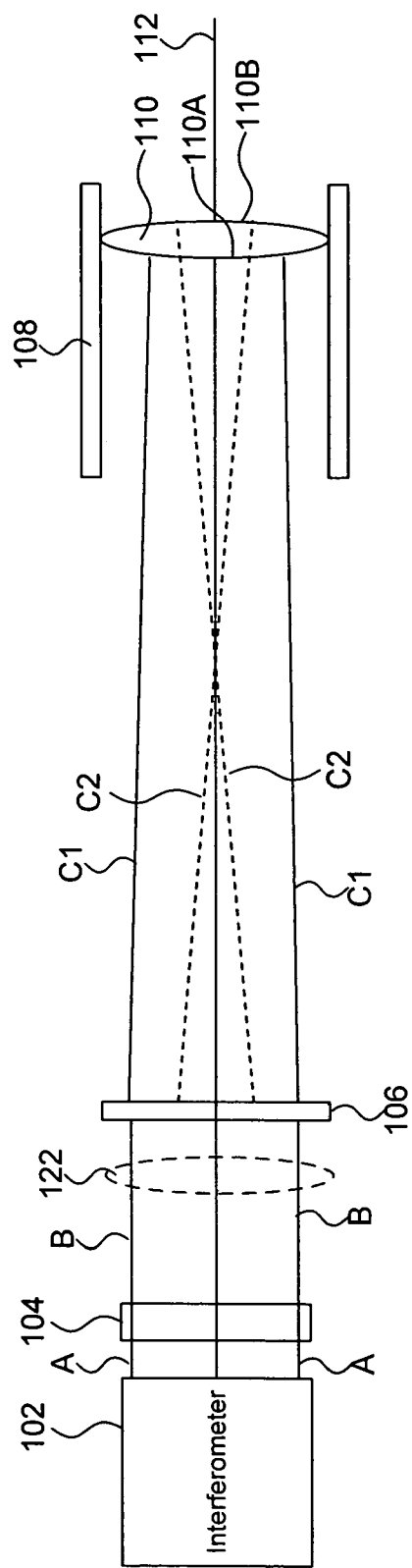
Figure 1B:
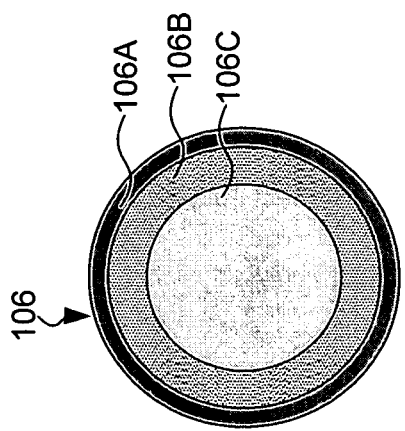

FIGS. 1A, 1B and 1C show an alignment system according to the present invention for use in lens alignment. FIG. 1A shows the overall system, and FIGS. 1B and 1C show exemplary diffractive elements that can be used in such an alignment system.

As shown in FIG. 1A, the following optical elements are used: an interferometer 102, a transmission flat, or a transmission sphere or a lens 104, a diffractive alignment element 106, a lens housing or cell 108, and the lens being aligned 110. FIG. 1 also illustrates the various beams used in the optical alignment process. Illustrated in FIG. 1 is the test beam exiting the interferometer: A. Beam A2 (and then B2 and C2 represents the optical axes for the interferometer, reference optic (transmission sphere, etc.) and diffractive alignment optics). A portion of beam A reflects off element 104 back toward the interferometer where it is used to align element 104 to the interferometer. The portion of the beam not reflected passes through the optical transmission flat 104, becoming B. After passing through the diffractive alignment element 106, it splits to become C1, such that it is perpendicular to the front surface 110A of the lens 110, so that it is reflected exactly back on itself. Beam C2 functions in the same manner where it is designed to hit surface 110B at normal incidence, so that it also reflects exactly back on itself if the lens 110 is properly aligned.

FIG. 1B illustrates how the diffractive optical element looks in a plan view. In one embodiment, the diffractive alignment element 106 can have an outer annulus 106A, used to align the interferometer 106. An inner annulus 106B is used to align a concave surface, in other words, the surface 110A. An inner region 106C is used to align the rear surface 10B (in this case, a convex surface).

Note that the regions need not be concentric as shown in FIG. 1B, and any number of arrangements of these regions are possible, as shown in FIG. 1C. In the case of FIG. 1B, the grating can be a circular grating, rather than a grating that uses parallel rulings. Note that the circles (if circles are used) need not be concentric, and may not all be concentric, and may also not all be centered in the center of the diffractive alignment element 106. The alignment zones do not have to be concentric regions as shown in the lower left figure. The case shown in the lower right figure illustrates how the different alignment zones can be placed on different areas on the diffractive element 106. Either of these types of designs can be developed using commercially available software. The exact pattern of the grating of a diffractive optical element 106 will depend on the parameters (size, radius of curvature, aspheric profile, etc.) of the lens 110 being aligned, the parameters of the interferometer 102, the transmission flat 104, and the distances between the components. One of ordinary skill in the art will readily understand how to produce such diffractive optical elements 106, given the description herein.

Thus, as described above, the diffractive optical element 106 (whether one shown in FIG. 1B, or FIG. 1C, or some other configuration) has several different alignment zones, or regions, 106A–106C formed on it. One zone (106A) is used to align the alignment element 106 to the interferometer 102. This alignment step can be done in up to 6 axes if required. The wavefront from the interferometer alignment zone 106A is used to align the diffractive alignment element 106 in tilt and/or location with respect to the interferometer 102. The second alignment zone 106B is designed to focus at the center of curvature of the front lens surface 111A. The third alignment zone 106C focuses at the center of curvature of the rear lens surface 110B, taking to account the lens 110 curvature and lens 110 material thickness. The third alignment zone also takes in to account the aberrations introduced into beam C2 by surface 110A and the refractive index of the lens material. The shape and area of the different alignment zones 106A–106C is selected based on the radii of curvature of the lens 110 (or mirror surfaces, if a reflective element is being aligned) and the alignment accuracy that needs to be achieved. The fringe pattern viewed using the interferometer detector system appears differently depending on the state of the alignment of the different surfaces. Examples of the appearance of fringe patterns that result from misalignment can be found in optics textbooks.

Multi-element optical systems consisting of lenses and/or mirrors can also be aligned using diffractive alignment elements. FIG. 2A illustrates one arrangement that may be used to align a multi-element lens. As shown in FIG. 2A, a lens element 212, in this case, a second lens element, may be added to the system of FIG. 1. In this case, a different diffractive alignment element 206 may be used, one that is optimized to align the second lens element 212, given its desired optical characteristics and position relative to other optical components of the system.

As shown in FIG. 2B the diffractive alignment element 106 used in aligning the first element can be replaced by a different one (element 206, with alignment zones 206A, 206B, 206C), designed to align the second lens 212. Alternatively, a second diffractive element can be added (not shown in the figure). The second (or different) diffractive alignment element is aligned to the interferometer same as the first element 106, thus giving both diffractive alignment elements a common datum.

Figure 3:
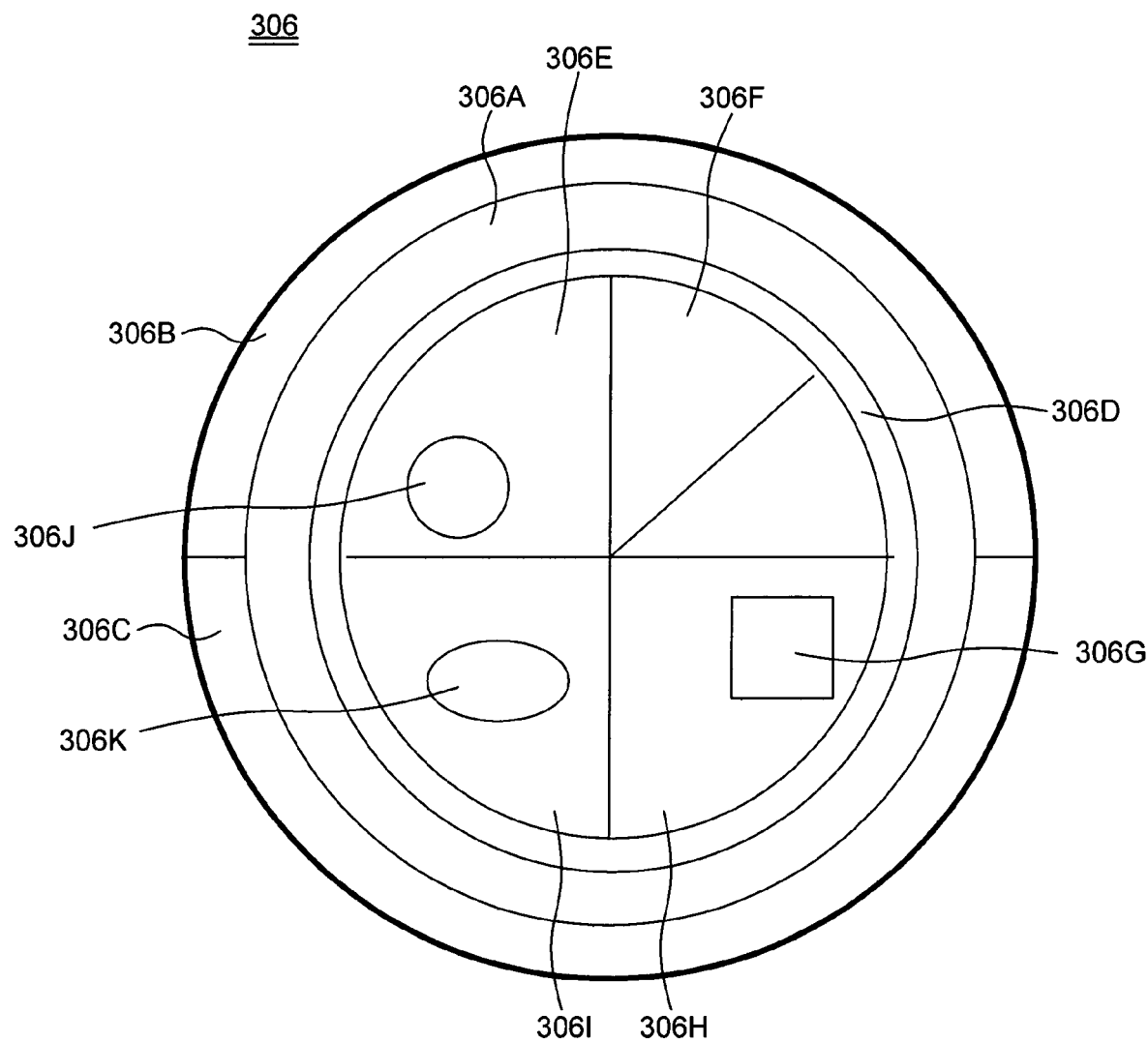
FIG. 3 illustrates how a single diffractive alignment element may be used to align multiple lenses.

FIG. 3 illustrates how a single diffractive alignment element 306 may be used to align multiple lenses. The diffractive alignment element 306 can be divided up into different regions 306A–306K, each of the regions used for a particular lens. For example, as shown in FIG. 3, some of the regions 306A–306K may be used for alignment of spherical, as well as aspherical components, as well as for alignment of on axis versus off-axis components. The corresponding software that interprets the interferometric fringes can be easily modified to recognize only those portions of the fringe pattern that relate to the particular lens being aligned at the moment. FIG. 3 shows a diffractive alignment element 306 with alignment zones 306A–306K for multiple lens elements. This eliminates the need to replace the diffractive alignment element for each element being designed. How many lenses a single diffractive alignment element can align depends on the optical assembly's alignment tolerances.

Figure 4A:
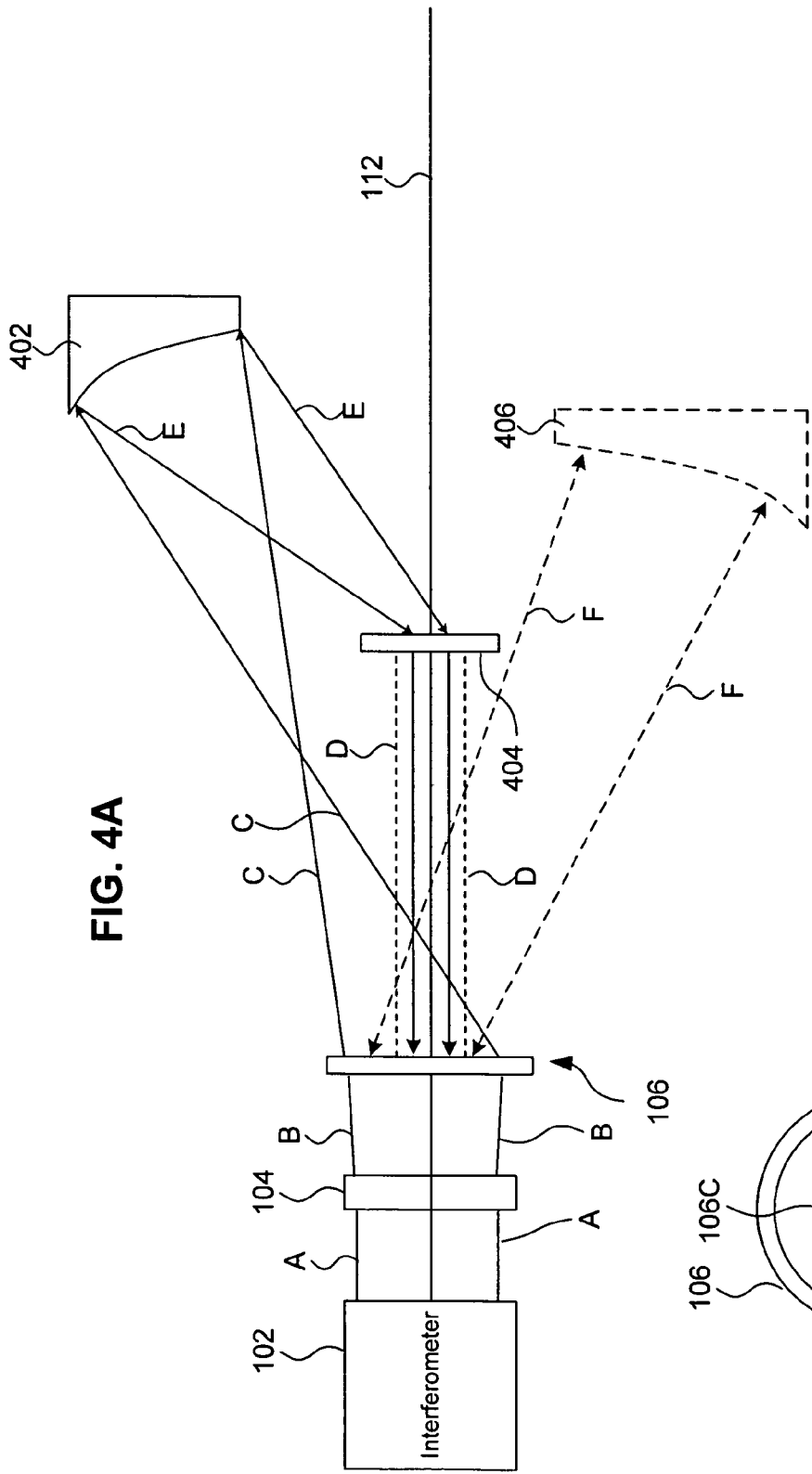
FIGS. 4A and 4B illustrates the use of the present invention with off-axis reflective systems.
Figure 4B:
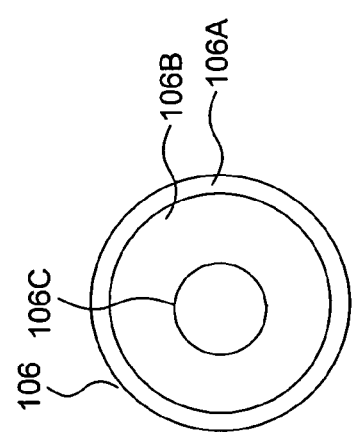

An example of how the diffractive alignment element is used with a mirror-based system is shown in FIG. 4A. FIG. 4B shows an exemplary diffractive alignment element that may be used in this application. Alignment configurations for a mirror exist using both one and two diffractive alignment elements. The configuration selected depends on the accuracy requirements and the number of elements in the optical system being aligned.

FIG. 4A is illustrative of the case of off-axis reflective systems. This is regarded as a particularly difficult problem in the art. As shown in FIG. 4A, in order to align the off-axis aspheric mirror 402, two diffractive alignment elements may be used—the first element 106, similar to what is shown on FIG. 1A, and a second diffractive alignment element 404, positioned as shown in FIG. 4A. The general principle regarding the operation of these diffractive elements 106, 404 is as described above with reference to FIGS. 1A and 2A. In this case, the beam from the interferometer 102 pass through the transmission flat 104, When the beam reaches the diffractive alignment element 106, part of the beam is diffracted towards the off-axis aspheric mirror 402 and part is diffracted (or transmitted) toward the second diffractive alignment element 404. The part of the beam that is diffracted toward the off-axis aspheric mirror 402 is reflected of the mirror surface in the direction of the second diffractive alignment element 404. This beam is then diffracted by the second diffractive element 404 back to the off-axis aspheric mirror 402, or can be transmitted towards the first diffractive alignment element 106. In other words, the diffractive element 404 can be either reflective or transmissive, and is usually a grating.

Note that, as in the case of FIGS. 2 and 3, where a single diffractive alignment optical element can have multiple zones used for alignment of different components, similarly multiple off-axis components can be aligned using the same two diffractive elements 106, 404, shown in FIG. 4, in the same manner as discussed above with reference to a multi-element lens.

The present invention has the a number of advantages. Optical assemblies (lenses or mirrors) can be aligned to better accuracy than is currently achievable using mechanical and alignment telescope-based processes. Also, an optical assembly can be aligned more accurately than is currently achieved using the assembled system wavefront and distortion measurement process. This is a result of the individual elements being able to be aligned more accurately during the lens assembly integration process as compared to the standard techniques employed during the typical assembly level alignment optimization.

The alignment process is much faster then either the mechanical indicating or alignment telescope process. An alignment check on a surface or element can be made in the time it takes to take a standard interferometric measurement, which is less than 10 seconds. Also, off-the-shelf interferogram reduction software can be used to analyze the interference patterns over the alignment zones in the diffractive alignment element. The interferogram reduction software can be used to determine the aberration content, which in tern can be used to calculate the required motions of the optic to bring it in to perfect alignment.

On and off-axis aspheric surfaces can be aligned as easily as spherical surfaces. For aspheric surfaces the alignment zones can be designed to be the equivalent of a null-corrector so spherical wavefronts, not distorted ones, are being used during the alignment process.

The alignment process can take into account the effects of lens material in-homogeneity by making alignment measurement through a lens. Axial spacing of an optical surface can be determined by measuring power in the wavefront reflected off or transmitted through the surface being aligned.

The technology required for fabricating the diffractive alignment elements is well developed and readily available. Substrates the alignment-grating pattern is written on can be fabricated to exceptionally high qualities using the MRF (Magnetorheological Finishing) or CCOC (Computer Controlled Optical Surfacing) polishing process. Any number of integrated circuit reticle manufacturers can manufacture the grating pattern on the diffractive alignment element. Diffractive alignment zones can be designed using most commercially available optical design programs. The optical design programs can easily output the design in a format suitable for grating manufacturers.

Having thus described a preferred embodiment of a system and method, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A system for aligning of optical components, comprising:
   an interferometer configured to produce a beam and to detect fringes;
   a reference optic configured to reflect a portion of the beam back towards the interferometer as a reference beam and transmit a second portion of the beam;
   a diffractive element including first and second regions, the first region configured to reflect a first part of the second portion of the beam back towards the interferometer as a first measurement beam and the second region configured to diffract a second part of the second portion of the beam to produce a diffraction beam; and
   an optical element configured to reflect the diffraction beam back to the interferometer as a second measurement beam,
   wherein at least one of: (a) a first fringe is detected by the interferometer based on interference between the first measurement beam and the reference beam, such that the diffractive element is aligned based on the first fringe, and (b) a second fringe is detected by the interferometer based on interference between the second measurement beam and the reference beam, such that the optical element is aligned based on the second fringe.

2. The system of claim 1, wherein the second region of the diffractive element comprises:
   a first diffraction region that is configured to form a first part of the diffraction beam, which interacts with a first, front surface of the optical element; and
   a second diffraction region that is configured to form a second part of the diffraction beam, which reflects from a second, back surface of the optical element.

3. The system of claim 2, wherein the first and second diffraction regions, are generally concentric circles.

4. The system of claim 1, further comprising:
   a second optical element; and
   a second diffractive element, wherein the first diffractive alignment element is exchanged with the second diffractive element and is configured to be used to align the second optical element.

5. The system of claim 1, further comprising:
   a plurality of the optical elements; and
   wherein the diffractive element comprises a plurality of the second areas, each of the second areas being configured to form respective parts of the diffraction beam used for alignment of a different surfaces of a the plurality of optical elements.

6. The system of claim 1, wherein the optical element is a reflective element.

7. The system of claim 1, wherein the optical element is a refractive element.

8. The system of claim 1, wherein the optical element is an off-axis optical element.

9. The system of claim 8, further comprising a second diffractive element that produces interference fringes in the interferometer using a reflection off the off-axis optical element.

10. The system of claim 9, wherein the second diffractive element is a transmissive grating.

11. The system of claim 9, wherein the second diffractive element is a reflective grating.

12. The system of claim 1, wherein the optical element has a spherical surface.

13. The system of claim 1, wherein the optical element has an aspheric surface.

14. The system of claim 1, wherein the reference optic is a transmission flat, a transmission sphere, or a lens located between the interferometer and the diffractive element.

15. The system of claim 1, wherein the optical element is a lens or a reflecting device.

* * * * *